United States Patent
Brown

(10) Patent No.: US 11,854,326 B2
(45) Date of Patent: Dec. 26, 2023

(54) AUTHENTICATION OF WEARABLE DEVICES ASSOCIATED WITH A PREMISES SECURITY SYSTEM

(71) Applicant: The ADT Security Corporation, Boca Raton, FL (US)

(72) Inventor: Neil Brown, Wayne, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 17/970,244

(22) Filed: Oct. 20, 2022

(65) Prior Publication Data

US 2023/0118816 A1 Apr. 20, 2023

Related U.S. Application Data

(60) Provisional application No. 63/257,857, filed on Oct. 20, 2021.

(51) Int. Cl.
| | |
|---|---|
| *G07C 9/22* | (2020.01) |
| *G07C 9/27* | (2020.01) |
| *G07C 9/00* | (2020.01) |
| *G08B 25/00* | (2006.01) |
| *G08B 25/01* | (2006.01) |
| *H04L 9/40* | (2022.01) |

(52) U.S. Cl.
CPC ........ *G07C 9/22* (2020.01); *G07C 9/00309* (2013.01); *G07C 9/27* (2020.01); *G08B 25/008* (2013.01); *G08B 25/016* (2013.01); *H04L 63/0807* (2013.01); *G07C 2009/00769* (2013.01); *G07C 2209/63* (2013.01)

(58) Field of Classification Search
CPC ........ G07C 9/22; G07C 9/00309; G07C 9/27; G08B 25/008
See application file for complete search history.

(56) References Cited

U.S. PATENT DOCUMENTS

| | | | |
|---|---|---|---|
| 8,371,501 B1 | 2/2013 | Hopkins | |
| 9,800,570 B1 | 10/2017 | Bleisch | |
| 9,898,880 B2 * | 2/2018 | Nagisetty | G07C 9/29 |
| 10,893,412 B2 | 1/2021 | Rothkopf et al. | |
| 11,087,572 B2 | 8/2021 | Einberg et al. | |
| 11,501,586 B1 * | 11/2022 | Rojas | G07C 9/00571 |

(Continued)

*Primary Examiner* — Nabil H Syed
(74) *Attorney, Agent, or Firm* — Christopher & Weisberg, P.A.

(57) ABSTRACT

In some embodiments, an authentication device is provided. The authentication device configured to determine that the wearable device is authorized to participate in the premises security system, cause transmission of a first security token that is usable to validate that the wearable device is authorized to participate in the premises security system, in response to the status update, request the first security token from the wearable device, validate that the wearable device is authorized to participate in the premises security system based at least in part on the first security token received from the wearable device and in response to validating that the wearable device is authorized to participate in the premises security system, cause transmission of a second security token to the wearable device where the second security token is usable to trigger a premises security system action.

18 Claims, 9 Drawing Sheets

(56) References Cited

U.S. PATENT DOCUMENTS

| | | | |
|---|---|---|---|
| 2015/0039880 A1* | 2/2015 | Aminzade | G06F 21/35 |
| | | | 713/100 |
| 2017/0357792 A1* | 12/2017 | Itoh | G06F 21/35 |
| 2019/0230512 A1 | 7/2019 | Wentz et al. | |
| 2020/0372147 A1 | 11/2020 | D'Agostino et al. | |
| 2021/0184858 A1* | 6/2021 | Perry | G06F 21/35 |
| 2022/0172202 A1* | 6/2022 | Wedmore | G07F 17/12 |

* cited by examiner

AUTHENTICATION OF WEARABLE DEVICES ASSOCIATED WITH A PREMISES SECURITY SYSTEM

CROSS-REFERENCE TO RELATED PATENT APPLICATION

This application is related to and claims priority to U.S. Provisional Patent Application Ser. No. 63/257,857, filed Oct. 20, 2021, entitled AUTHENTICATION OF WEARABLE DEVICES ASSOCIATED WITH A PREMISES SECURITY, the entirety of which is incorporated herein by reference.

TECHNICAL FIELD

The present invention relates to premises security systems and/or security systems, and in particular, to wearable devices used in the security system and/or premises security system.

BACKGROUND

Some devices that can be worn on a person's body and include certain electronic components, e.g., used for wireless communication, are typically referred to as wearable devices. Wearable devices are gaining popularity but do not yet reliably identify a wearer and/or determine whether the wearer is an authorized wearer. Although some wearable devices include fingerprint scanners to identify the wearer, including fingerprint scanners add at least complexity, and/or physical size to wearable devices. In other words, typical wearable devices either allow anyone who has possession of the wearable device to use the features offered by the wearable device or the wearable device requires complex fingerprint scanning.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
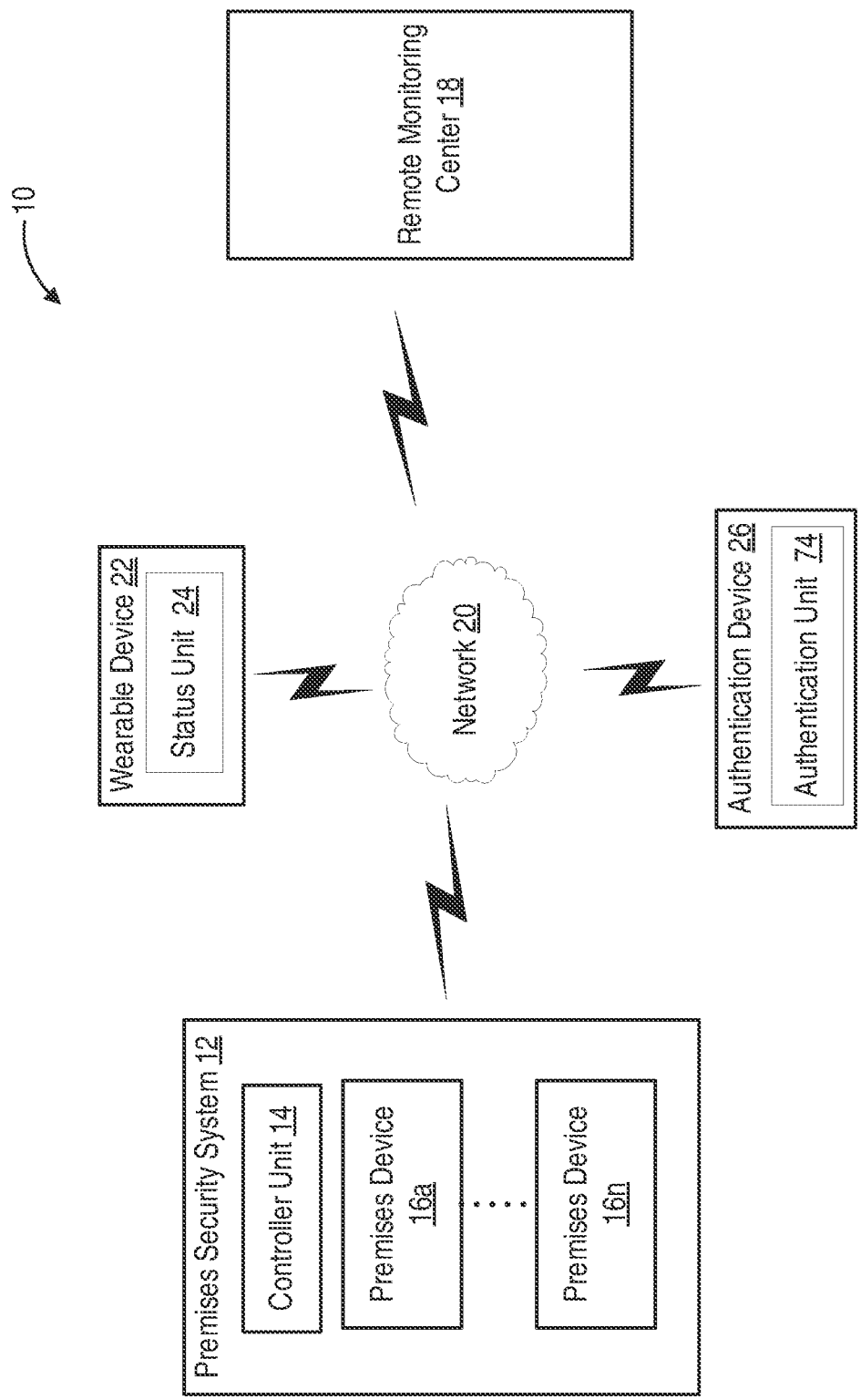
FIG. 1 is a diagram of an example system comprising a premises security system and/or at least a wearable device according to principles disclosed herein.

Before describing in detail exemplary embodiments, it is noted that the embodiments may reside in combinations of apparatus components and processing steps related to determining whether a device is being worn and/or used by an authorized user/wearer and/or trigger the at least one premises security action. Accordingly, components may be represented where appropriate by conventional symbols in the drawings, so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including," "has" and/or "having" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a diagram of an example system 10 comprising a premises security system 12 and/or at least a wearable device 22. Premises security system 12 comprises a controller unit 14 and/or premises devices 16a and 16n (collectively referred to as premises device 16). Controller unit 14 may be configured to communicate with any component of system and perform and/or trigger at least one premises security action associated with any component of system 10. Although premises security system 12 is shown as comprising premises devices 16a and 16n, premises security system 12 is not limited to comprising only premises devices 16a and 16n and may include additional premises devices 16. Any premises device 16 can be in simultaneous communication and/or configured to separately communicate with more than one other premises device 16 and/or other premises security system 12 and/or other system Although premises device 16 is included in the premises security system 12, premises device 16 is not limited to being included in the premises security system 12 and/or system 10 and may reside standing alone, as part of another system, or in any other manner.

Further, each premises device 16 may include one or more of sensors, control panels, control devices, image capture devices, life safety devices, life style devices and other devices. For example, the types of sensors may include various life safety related sensors, such as motion sensors, fire sensors, carbon monoxide sensors, flooding sensors and contact sensors, among other sensor types. The control devices may include, for example, one or more lifestyle (e.g., home automation) related devices configured to adjust at least one premises setting such as lighting, temperature, energy usage, door lock and power settings, among other settings associated with the premises or devices on the premises. Image capture devices may include digital cameras and/or video cameras, among other image capture devices.

System 10 may also include a remote monitoring center 18, which may be capable of performing certain monitoring, configuration and/or control functions associated with system 10. For example, with respect to fire and carbon monoxide detectors, monitoring data may include carbon monoxide readings, smoke detection readings, data representing a sensor location and time of reading, among other related to these detectors that may be communicated with remote monitoring center 18. In yet another example, with respect to a door contact detector, monitoring data may include data representing a sensor location and time of detection, among other data related to the door contact detection that may be communicated with remote monitoring center 18.

Alarm event data from the premises devices 16 may be used by the remote monitoring center 18 for performing various safety response processes in notifying the owner of the premises, determining whether an actual alarm event is occurring at the premises, and notifying any appropriate response agency (e.g., police, fire, emergency response, other interested parties such as premises owners, etc.).

Further, system 10 may include wearable device 22 and/or authentication device 26. Wearable device 22 may be a device worn by a user and that is configurable for direct/indirect communication with authentication device 26 and/or any other component of system 10. In a non-limiting example, wearable device 22 may be a device that is not being worn but is within a predetermined proximity to a person associated with the device and/or a predetermined proximity to any of the components of system 10. In another non-limiting example, the wearable device 22 may generally be considered as being removably attachable to a person. Wearable device 22 may include a status unit 24 which may be configured at least to determine to cause a transmission of a signal indicating at least a worn state of the wearable device 22, e.g., where the transmitted signal is configured to cause at least the authentication device 26 to trigger the at least one premises security action. The worn state of the wearable device 22 is not limited to a state indicating whether the wearable device 22 is worn and may indicate any other state. According to various embodiments, non-limiting examples of wearable devices 22 include wireless-enabled electronic watches, sunglasses, rings, bracelets, subdermal implants, etc. that have the ability to communicate with other electronic devices.

Authentication device 26 may refer to any device configurable for direct and/or indirect communication with wearable device 22 and/or any other component of system 10. Authentication device 26 may include authentication unit 74, which may be configured at least to trigger at least one premises security action, e.g., based on a signal received from the wearable device 22 and/or a security token. Although authentication device 26 is shown as a standalone device, authentication device 26 is not limited to being standalone and may be part of any component of system 10, e.g., controller unit 14 and/or premises security system 12 and/or remote monitoring center 18. Further, premises security system 12 and/or controller unit 14 and/or remote monitoring center 18 may be configured to have the same or similar components, e.g., hardware and/or software, as those described for authentication device 26.

Further, system 10 may include network 20 (which may refer to a plurality of networks such as network 20a, 20b, 20c, 20n), which may be configured to provide direct and/or indirect communication, e.g., wired and/or wireless communication, between any two or more components of system 10, e.g., premises security system 12, premises device 16, controller unit 14, remote monitoring center 18, wearable device 22, authentication device 26. In a non-limiting example, premises device 16 of premises security system 12 may communicate with the remote monitoring center 18 via network 20, e.g., to provide alarm event data associated with premises security system 12. Similarly, wearable device 22 may communicate with authentication device 26 and/or controller unit 14 via network 20, e.g., to provide a status associated with the wearable device 22. Although network 20 is shown as an intermediate network between components and/or devices of system 10, any component/device may communicate directly with any other component/device of system 10. In a non-limiting example, wearable device 22 may communicate directly with authentication device 26, premises security system 12, controller unit 14, premises device 16, and/or remote monitoring center 18. Similarly, authentication device 26 may communicate directly with wearable device 22, premises security system 12, controller unit 14, premises device 16, and/or remote monitoring center 18.

Note further that functions described herein as being performed by a wearable device 22 or authentication device 26 may be distributed over a plurality of wearable devices 22 and/or authentication devices. In other words, the functions of the wearable device and authentication device described herein are not limited to performance by a single physical device and can be distributed among several physical devices.

Figure 2:
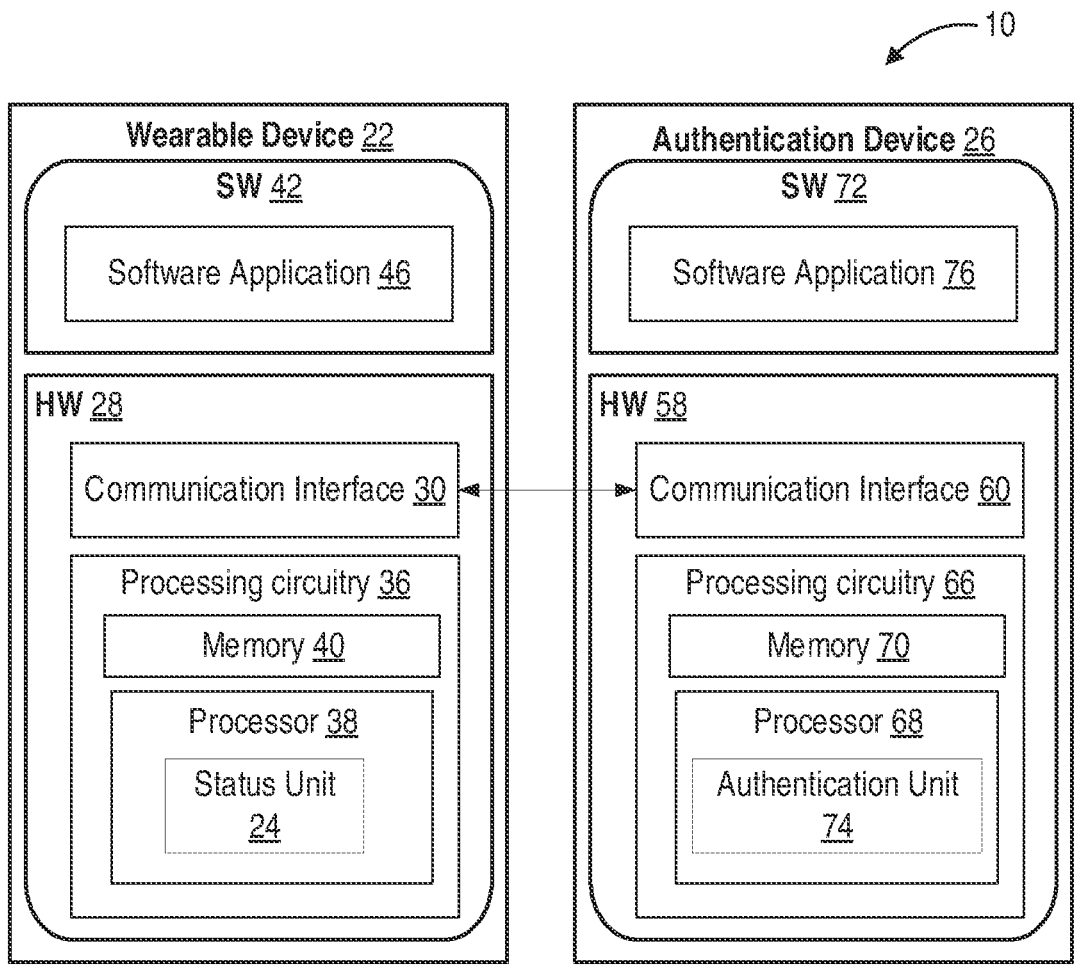
FIG. 2 is a block diagram of some devices in the system according to some embodiments of the present disclosure.

Example implementations, in accordance with an embodiment, of system 10 discussed in the preceding paragraphs will now be described with reference to FIG. 2.

The system 10 includes a wearable device 22 including hardware 28. The hardware 28 may include processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or Field Programmable Gate Arrays (FPGAs) and/or Application Specific Integrated Circuits (ASICs) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 40 may be configured as a storage device.

Hardware 28 of wearable device 22 may include communication interface 30 enabling it to communicate directly/indirectly with any component/device of system 10. For example, communication interface 30 may be configured for setting up and maintaining at least a wireless/wired connection with any component and/or device of system 10 such as authentication device 26. The communication interface 30 may be formed as or may include, for example, one or more RF transmitters, one or more RF receivers, and/or one or more RF transceivers.

Wearable device 22 further has software 42 (which may include software application 46) stored internally in, for example, memory 40, or stored in external memory (e.g., database, storage array, network storage device, etc.) accessible by the wearable device 22 via an external connection. Software application 46 may include any software/program configured to perform the steps/processes of the present disclosure, e.g., providing an interface for a user to provide an input to the wearable device 22 and/or receive an output from the wearable device 22. Further, software application 46 may run and/or be included directly as part of software 42 and/or wearable device 22. Software application 46 may be virtualized and/or running outside wearable device 22 and/or any of the components of wearable device 22.

The processing circuitry 36 may be configured to control any of methods and/or processes described herein and/or to cause such methods, and/or processes to be performed, e.g., by wearable device 22. Processor 38 corresponds to one or more processors 38 for performing wearable device 22 functions described herein. The memory 40 is configured to store data and/or files and/or encryption elements, e.g., security tokens/keys, and/or programmatic software code and/or other information described herein. In some embodiments, the software 42 may include instructions that, when executed by the processor 38 and/or processing circuitry 36, causes the processor 38 and/or processing circuitry 36 to perform the processes described herein with respect to wearable device 22. For example, processing circuitry 36 of the wearable device 22 may include status unit 24 which may be configured at least to determine to cause a transmission of a signal indicating at least a worn state of the wearable device, e.g., where the transmitted signal is configured to cause at least the authentication device 26 to trigger the at least one premises security action.

The system 10 further includes authentication device 26 including hardware 58. The hardware 58 may include processing circuitry 66. The processing circuitry 66 may include a processor 68 and a memory 70. In particular, in addition to or instead of a processor, such as a central processing unit, and memory, the processing circuitry 66 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 68 may be configured to access (e.g., write to and/or read from) the memory 70, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 70 may be configured as a storage device.

Hardware 58 of authentication device 26 may include communication interface 60 enabling it to communicate directly/indirectly with any component/device of system 10. For example, communication interface 60 may be configured for setting up and maintaining at least a wireless/wired connection with any component/device of system 10 such as wearable device 22. The communication interface 60 may be formed as or may include, for example, one or more RF transmitters, one or more RF receivers, and/or one or more RF transceivers.

Authentication device 26 further has software 72 (which may include software application 76) stored internally in, for example, memory 70, or stored in external memory (e.g., database, storage array, network storage device, etc.) accessible by the authentication device 26 via an external connection. Software application 76 may include any software/program configured to perform the steps/processes of the present disclosure, e.g., providing an interface for a user to provide an input to the authentication device 26 and/or receive an output from the authentication device 26. Further, software application 76 may run and/or be included directly as part of software 72 and/or authentication device 26. Software application 76 may be virtualized and/or running outside authentication device 26 and/or any of the components of authentication device 26.

The processing circuitry 66 may be configured to control any of methods and/or processes described herein and/or to cause such methods, and/or processes to be performed, e.g., by authentication device 26. Processor 68 corresponds to one or more processors 38 for performing authentication device 26 functions described herein. The memory 70 is configured to store data and/or files and/or encryption elements, e.g., security tokens/keys, and/or programmatic software code and/or other information described herein. In some embodiments, the software 72 may include instructions that, when executed by the processor 68 and/or processing circuitry 66, causes the processor 68 and/or processing circuitry 66 to perform the processes described herein with respect to authentication device 26. For example, processing circuitry 66 of the authentication device 26 may include authentication unit 74 which may be configured at least to trigger at least one premises security action, e.g., based on a signal received from the wearable device 22 and/or a security token.

Figure 3:
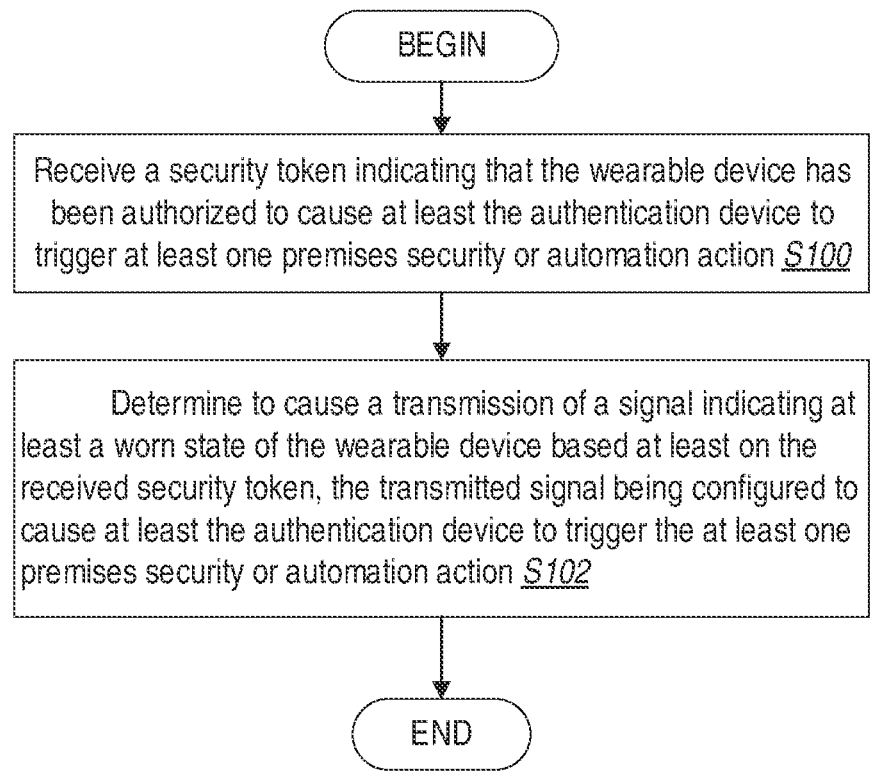
FIG. 3 is a flowchart of an example process in a wearable device according to some embodiments of the present disclosure.

FIG. 3 is a flowchart of an example process in a wearable device 22 for determining to cause a transmission of a signal indicating at least a worn state of the wearable device 22. One or more blocks described herein may be performed by one or more elements of wearable device 22 such as by one or more of processing circuitry 36 (including the status unit 24) and/or processor 38 and/or status unit 24 and/or communication interface 30. Wearable device 22 such as via processing circuitry 36 and/or communication interface 30 is configured to receive (Blocks S100) a security token indicating that the wearable device has been authorized to cause at least the authentication device to trigger at least one premises security action; and determine (Block S102) to cause a transmission of a signal indicating at least a worn state of the wearable device based at least on the received security token. The transmitted signal is configured to cause at least the authentication device to trigger the at least one premises security action.

In some embodiments, the communication interface 30 is further configured to establish communication with the authentication device 26; and receive another security token from the authentication device after the wearable device 22 has been added to the system 10. The other security token is received for the authentication device 26 to determine that a user of the wearable device is in control of the wearable device 22. The processing circuitry 36 is further configured to determine to cause a transmission of another signal indicating any one of a communication state and the worn state.

In some other embodiments, the worn state is determined, where the worn state is one of worn and not worn.

In an embodiment, the communication interface 30 is further configured to transmit any one of the signal and the other signal at least to the authentication device 26.

In another embodiment, the at least one premises security action includes one of arming the premises security system 12 and disarming the premises security system 12.

Figure 4:
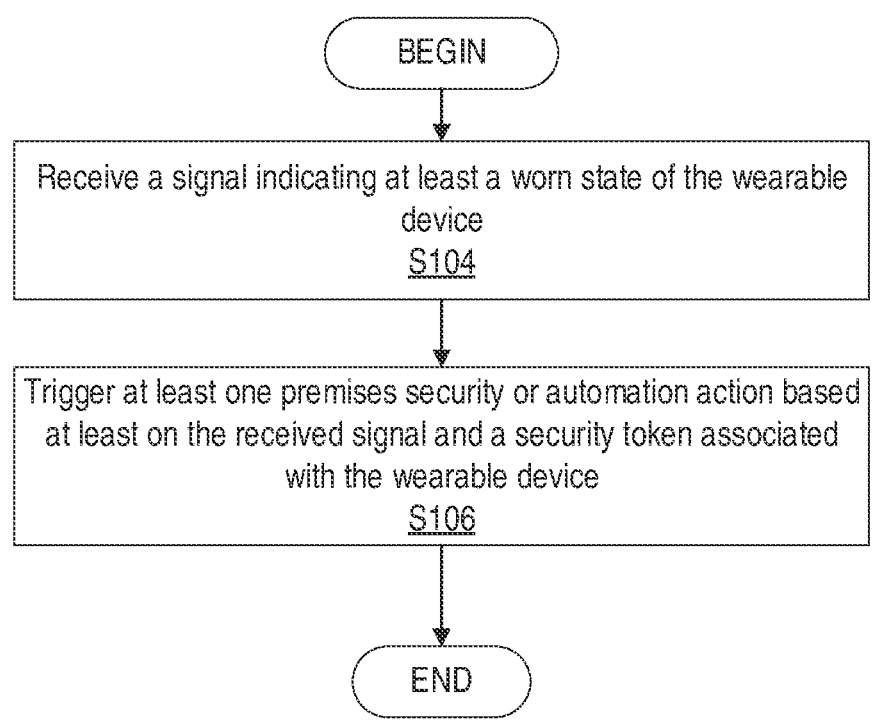
FIG. 4 is a flowchart of an example process in an authentication device according to some embodiments of the present disclosure.

FIG. 4 is a flowchart of an example process in an authentication device 26 for triggering at least one premises security action. One or more blocks described herein may be performed by one or more elements of authentication device 26 such as by one or more of processing circuitry 66 (including the authentication unit 74) and/or processor 68 and/or communication interface 60. Authentication device 26 is configured to receive (Blocks S104) a signal indicating at least a worn state of the wearable device. Authentication device 26 is configured to trigger (Block S106) trigger at least one premises security action or automation action (e.g., lifestyle action, home automation action, etc.) based at least on the received signal and a security token associated with the wearable device 22.

In some embodiments, the communication interface 60 is further configured to establish communication with the wearable device 22. The processing circuitry 66 is further configured to add the wearable device to the system 10 and determine another security token after the wearable device 22 has been added to the security system10, the other security token being determined to determine that a user of the wearable device22 is in control of the wearable device 22. The communication interface 60 is further configured to transmit the other security token to the wearable device 22.

In some other embodiments, the processing circuitry 66 is further configured to determine that the user of the wearable device 22 is in control of the wearable device 22 based at least in part on the other security token at least by causing the communication interface 60 to retrieve the other security token from the wearable device 22.

In one embodiment, the processing circuitry 66 is further configured to authorize the wearable device 22 to trigger at least one premises security action based at least in part on the security token at least by causing the communication interface 60 to retrieve the security token from the wearable device 22.

In another embodiment, the at least one premises security action includes one of arming the premises security system 12 and disarming the premises security system 12.

Figure 5:
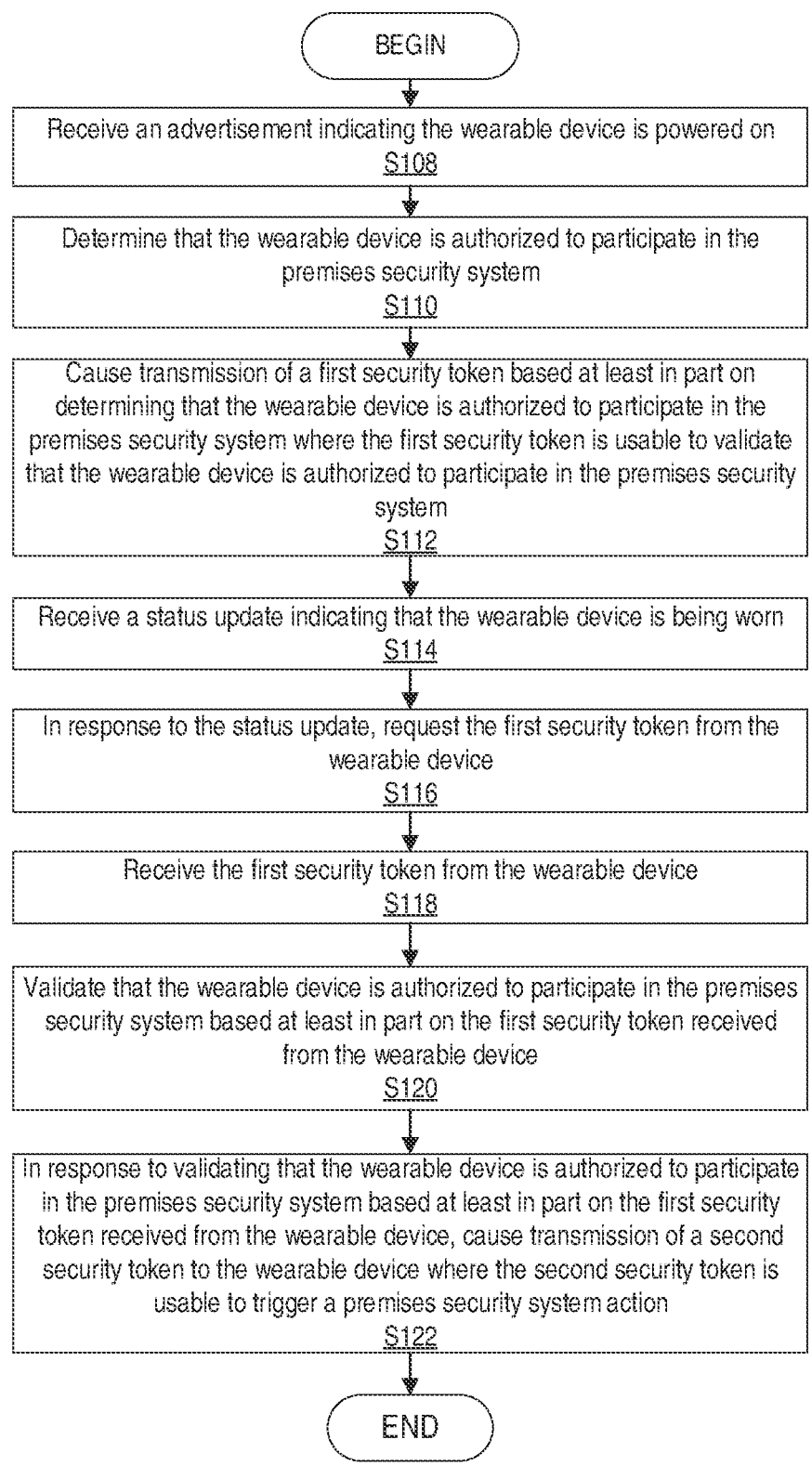
FIG. 5 is a flowchart of another example process in an authentication device according to some embodiments of the present disclosure.

FIG. 5 is a flowchart of an example process in an authentication device 26 that is associated with premises security system 12 and that is configured to communicate with wearable device 22. One or more blocks described herein may be performed by one or more elements of authentication device 26 such as by one or more of processing circuitry 66 (including the authentication unit 74) and/or processor 68 and/or communication interface 60. Authentication device 26 is configured to receive (Block S108) an advertisement indicating the wearable device 22 is powered on. Authentication device 26 is configured to determine (Block S110) that the wearable device 22 is authorized to participate in the premises security system 12. Authentication device 26 is configured to cause transmission (Block S112) of a first security token based at least in part on determining that the wearable device 22 is authorized to participate in the premises security system 12 where the first security token is usable to validate that the wearable device 22 is authorized to participate in the premises security system 12. Authentication device 26 is configured to receive (Block S114) a status update indicating that the wearable device 22 is being worn.

Authentication device 26 is configured to in response to the status update, request (Block S116) the first security token from the wearable device 22. Authentication device 26 is configured to receive (Block S118) the first security token from the wearable device 22. Authentication device 26 is configured to validate (Block S120) that the wearable device 22 is authorized to participate in the premises security system 12 based at least in part on the first security token received from the wearable device 22. Authentication device 26 is configured to, in response to validating that the wearable device 22 is authorized to participate in the premises security system 12 based at least in part on the first security token received from the wearable device 22, cause transmission (Block S122) of a second security token to the wearable device 22 where the second security token is usable to trigger a premises security system action.

According to one or more embodiments, the processing circuitry 66 is further configured to: receive, from the wearable device 22, a user request to trigger the premises security system action where the user request further indicates that the wearable device 22 is being worn, and, in response to the user request, cause transmission of a second security token request. The processing circuitry 66 is further configured to receive, in response to the second security token request, the second security token, validate that the wearable device 22 is authorized to participate in the premises security system 12 based at least in part on the security token received from the wearable device 22, and trigger the premises security system action based at least in part on validating that the wearable device 22 is authorized to participate in the premises security system 12.

According to one or more embodiments, the processing circuitry 66 is further configured to: receive an additional advertisement from the wearable device 22 where the additional advertisement indicates that the wearable device 22 is being worn, and in response to the additional advertisement, request the second security token from the wearable device 22. The processing circuitry 66 is further configured to receive the second security token from the wearable device 22, validate that the wearable device 22 is authorized to participate in the premises security system 12 based at least in part on the second security token received from the wearable device 22, after validating that the wearable device 22 is authorized to participate in the premises security system 12, determine that the wearable device 22 has left a communication range of the authentication device 26, and trigger the premises security system action in response to at least determining that the wearable device 22 has left the communication range of the authentication device 26.

According to one or more embodiments, the premises security system action comprises arming the premises security system 12. According to one or more embodiments, after transmitting the second security token to the wearable device 22, the first security token is no longer usable to validate that the wearable device 22 is authorized to participate in the premises security system 12. According to one or more embodiments, the processing circuitry 66 is further configured to: prompt a user of the authentication device 26 to confirm the user is wearing the wearable device 22, receive an indication that the user is wearing the wearable device 22, and cause transmission of the second security token to the wearable device 22 in response to the indication that the user is wearing the wearable device 22. According to one or more embodiments, the authentication device 26 is a mobile wireless device, a control panel of the premises security system 12, or a control device of the premises security system 12.

Figure 6:
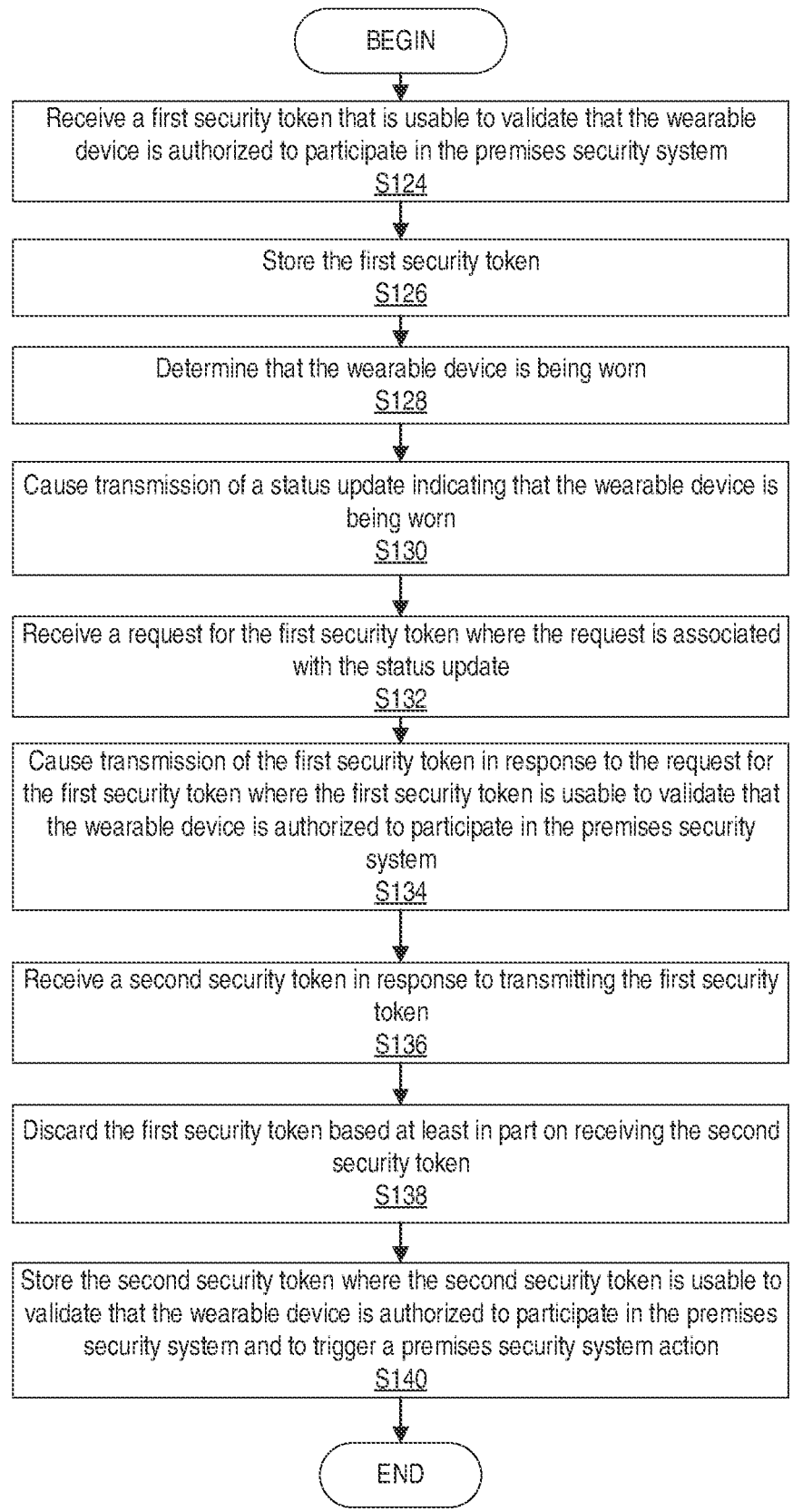
FIG. 6 is a flowchart of another example process in a wearable device according to some embodiments of the present disclosure.

FIG. 6 is a flowchart of an example process implemented by wearable device 22 that is configured to communicate with authentication device 26 that is associated with premises security system 12. One or more blocks described herein may be performed by one or more elements of wearable device 22 such as by one or more of processing circuitry 36 (including the status unit 24) and/or processor 38 and/or communication interface 30. Wearable device 22 is configured to receive (Block S124) a first security token that is usable to validate that the wearable device 22 is authorized to participate in the premises security system 12. Wearable device 22 is configured to store (Block S126) the first security token. Wearable device 22 is configured to determine (Block S128) that the wearable device 22 is being worn. Wearable device 22 is configured to cause (Block S130) transmission of a status update indicating that the wearable device 22 is being worn.

Wearable device 22 is configured to receive (Block S132) a request for the first security token where the request is associated with the status update. Wearable device 22 is configured to cause (Block S134) transmission of the first security token in response to the request for the first security token where the first security token is usable to validate that the wearable device 22 is authorized to participate in the premises security system 12. Wearable device 22 is configured to receive (Block S136) a second security token in response to transmitting the first security token. Wearable device 22 is configured to discard (Block S138) the first security token based at least in part on receiving the second security token. Wearable device 22 is configured to store (Block S140) the second security token where the second security token is usable to validate that the wearable device 22 is authorized to participate in the premises security system 12 and to trigger a premises security system action.

According to one or more embodiments, the processing circuitry 36 is further configured to: determine to trigger the premises security system action based at least in part on a user input, cause transmission of a user request indicating that the wearable device 22 is being worn and that the user requests that the premises security system action be triggered, receive a request for the second security token subsequent to transmitting the user request, and cause transmission of the second security token in response to the request for the second security token where the second security token is configured to trigger the premises security system action based at least in part on a validation of the second security token. According to one or more embodiments, the processing circuitry 36 is further configured to: determine that the wearable device 22 is no longer being worn, and, in response to determining that the wearable device 22 is no longer being worn, cause transmission of an advertisement indicating the wearable device 22 is not being worn. The processing circuitry 36 is further configured to receive a request for the second security token where the request for the second security token is associated with the advertisement indicating the wearable device 22 is not being worn, and cause transmission of the second security token in response to the request for the second security token to trigger the premises security system action.

According to one or more embodiments, the premises security system action comprises triggering a panic alarm. According to one or more embodiments, a sensor configured to determine that the wearable device 22 is being worn. According to one or more embodiments, the first security token is no longer usable to validate that the wearable device 22 is authorized to participate in the premises security system 12 after the second security token is received.

Figure 7:
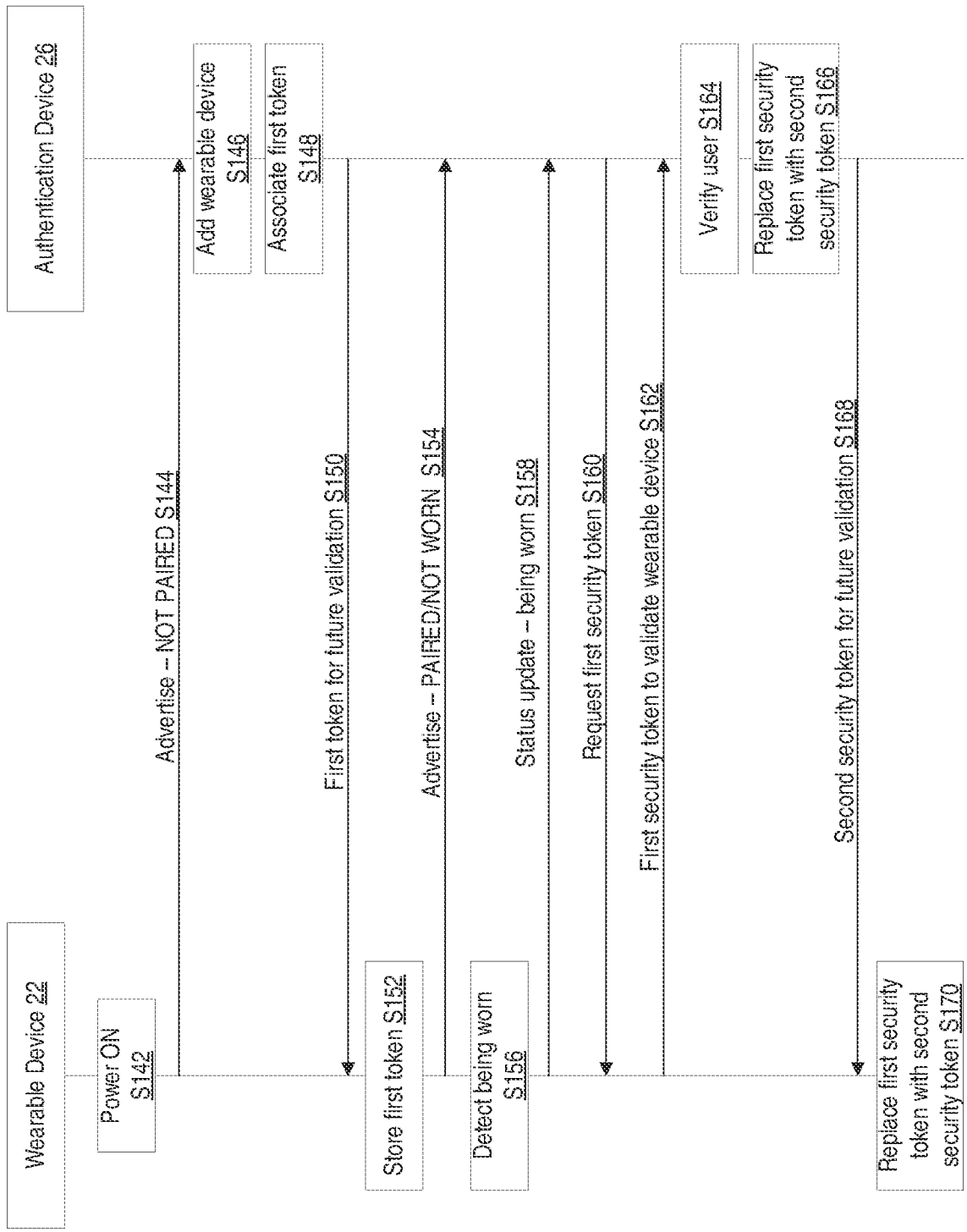
FIG. 7 is a signaling diagram of an example process according to some embodiments of the present disclosure.

FIG. 7 is an example signaling diagram according to the principles of the present invention. Wearable device 22 powers ON, e.g., a user powers ON the wearable device 22 (Step S142). Wearable device 22 transmits an advertisement indicating that wearable device 22 is NOT PAIRED (Step 144). Authentication device 26 adds wearable device 22 as an authorized device of premises security system 12 (Step S146). Authentication device 26 associates a first security token with wearable device 22 (Step S148). The first security token is usable to validate that the wearable device 22 is an authorized device of the premises security system 12. Authentication device 26 transmits the first security token to wearable device 22 for use in future validation of wearable device 22 (Step S150). Wearable device 22 receives and stores the first security token (Step S152). Wearable device 22 advertises that wearable device 22 is PAIRED/NOT WORN such as via advertisement beacons (Step S154).

Wearable device 22 detects wearable device 22 is being worn (Step S156). Wearable device 22 transmits a status update indicating that wearable device 22 is being worn (Step S158). The status update is based on the detection that wearable device 22 is being worn. Authentication device 26 requests the first security token from wearable device 22 via, for example, a secure connection (Step 160). The request for the first security token is in response to the status update of Step S158. Wearable device 22 transmits the first security token to authentication device 26 to validate wearable device 22 (S162).

Authentication device 26 verifies user (Step S164). For example, authentication device 26 may use a pop-up notification on a display of authentication device 26 to ask/request that the user confirm that the user is in control or wearing of wearable device 22. After the user has been verified, authentication device 26 replaces the first security token with the second security token (Step S166). For example, authentication device 26 may update the current security token to the second security token such that the first security token may be discarded. The second security token is usable to validate that the wearable device 22 is an authorized device of the premises security system and usable to trigger a premises security system action. The first security may not be usable to trigger a premises security system action. In one or more embodiments, the first security token is no longer usable to validate that the wearable device 22 is an authorized device of the premises security system.

Authentication device 26 transmits the second security token to wearable device 22 for future validation of the wearable device 22 such as to, for example, trigger a premises security system action (Step S168). Wearable device 22 receives the second security token and replaces the first security token with the second security token (Step S170).

Having described the general process flow of arrangements of the various embodiments and having provided examples of hardware and software arrangements for implementing processes and functions, the sections below provide details and examples of arrangements for authenticating wearable devices 22 used in a premises security system 12 and/or premises security system 12 and/or performing at least one premises security action.

One or more wearable device 22 functions described below may be performed by one or more of processing circuitry 36, processor 38, status unit 24, etc. One or more authentication device 26 functions described below may be performed by one or more of processing circuitry 66, processor 68, authentication unit 74, etc.

In some embodiments, at least wearable device 22 and/or authentication device 26 perform at least one of the following steps: (1) user authorization/verification for using wearable device 22; (2) storing a security token on the wearable device 22 based on the verification; and (3) use of the security token stored at the wearable device 22 to trigger at least one premises security action, e.g., perform a premises security system function.

For user authorization, authentication device 26 (e.g., a computer, phone, or any other device) may prompt the user to confirm that the user is in control of the wearable device 22. However, the user authorization performed on the authentication device 26 is not limited to a prompt and may be any other authorization process such as a face recognition process, a fingerprint recognition process, and/or any other recognition process. In a non-limiting example, a user's face may be recognized by a video capture device, e.g., a camera. The face recognition may be limited to occur within a predetermined time window of wearing (e.g., initially attached or initially wearing) wearable device 22 for user to be authorized. Further, a user may be authorized if wearable device 22 is 'worn' while wearable device 22 is within a predetermined area, e.g., an area including at least one component of system 10 such that the user is considered to be on premises. User authorization when the user is considered on premises may trigger automatic trusting of the user of the wearable device 22, thereby authorizing the user and, for example, causing a security token to be stored in wearable device 22.

When more than one wearable device 22 is being used by a user, e.g., wearable device 22*a* and wearable device 22*b*, obtaining user authorization may require each wearable device 22 to be worn within a predetermined time window. Further, each wearable device 22 having a worn state within a predetermined time window causes the authentication device 26 and/or any other component/device of system 10 to trigger/perform at least one premises security action.

In addition, the security token stored at the wearable device 22 may be used to validate the wearable device 22 and/or cause the authentication device 26 and/or any other component/device of system 10 to trigger/perform at least one premises security action such as a life-safety action and/or a life-style action. A life-style action may include any automation action. In a non-limiting example, at least one premises security action that typically requires a Personal Identification Number (PIN) when requesting to access or when leaving the premises may be triggered/performed when the wearable device 22 is validated, in the worn state, and within a predetermined proximity to the premises, thereby skipping the step of having to manually/physically enter a PIN in a keypad associated with the premises security system 12. Premises security actions that typically require a PIN may include arming/disarming, switching arm states (e.g., away/stay), access control for Multi-Dwelling Unit (MDU) and/or Medium-Sized Businesses (SMB) situations such as locking/unlocking a door where one or more of these actions/functions may be performed using the wearable device 22, as described herein. Further, at least one premises security action (e.g., performed/triggered by authentication device 26 and/or any other component/device of system 10) includes a life-style action such as changing light brightness and/or turning a fan on. The life-style action may be associated with a particular user and/or wearable device 22.

Some other embodiments provide a process for detecting an authorized user of a wearable device 22. The wearable device 22 may be configured to determine when the wearable device 22 is being worn, and advertising, e.g., by transmitting a signal, that a state, e.g., a worn state, has changed. The wearable device 22 may then wait for an authentication device 26, e.g., such as a mobile device, to wirelessly connect to the wearable device 22. When the authentication device, e.g., the mobile device, connects and verifies that wearable device 22 is a valid device, the authentication device 26 may then generate a prompt, e.g., for a user of the wearable device 22 and/or the authentication device 26, to verify/confirm that the user is the person who has physical control of the wearable device 22, e.g., the user has just put on the wearable device 22. Upon receiving confirmation from the user, authentication device 26, e.g., the mobile phone, and/or software 72 and/or a software application 76 of the authentication device 26 instructs wearable device 22 to change behavior such that wearable device 22 advertises, e.g., by transmitting at least a signal including packets, that wearable device 22 is now being worn. A flag may be set and/or a byte/bit may be changed when the wearable device 22 is worn (i.e., determined/detected to be worn) and validated (e.g., by the authentication device 26). One of the benefits of setting the flag and/or changing the byte/bit is avoiding querying (e.g., constant querying) of some wearable devices 22 (e.g., wearable devices 22 that have not been worn/validated) to obtain a wearable device state. Put differently, setting the flag and/or changing the byte/bit allows querying (e.g., limiting querying to) the wearable devices 22 for which the flag has been set and/or the byte/bit changed such as wearable devices 22 that have been worn/validated.

When wearable device 22 detects that is no longer being worn, wearable device 22 may change its advertising, e.g., by transmitting at least another signal including packets, again to reflect another worn state, i.e., not being worn. At this point, authentication device 26, e.g., a mobile phone, and/or controller unit 14 and/or remote monitoring center 18 and/or a premises device 16, e.g., a security base, a keypad, can connect such as via a receiver/transmitter to wearable device 22, validate a security token associated with the wearable device 22, and/or take/trigger at least one premises security action, as described herein. For example, the wearable device 22 may trigger the premises security system 12 arm based on the location of the wearable device 22, or may trigger lights in a particular room to turn on when the wearable device 22 is detected by the premises security system 12 as being located in that room, etc.

Wearable device 22 may detect, e.g., via status unit 24, that is being worn or not worn. In some embodiments, wearable device 22 may detect, e.g., via status unit 24, that is being worn and not worn by using, e.g., as part of and/or in communication with status unit 24, any one of the following:

A reed switch on at least a part of a strap (e.g., attachment mechanism/device/entity) of wearable device 22, e.g., on half of a strap, with a magnet on the remaining part of the strap. The strap may include but is not limited to a watch strap, a necklace clasp, and bracelet clasp;

A hall effect sensor on a part of a strap of wearable device 22, e.g., on half of a strap, with a magnet on the remaining part of the strap. The strap may include but is not limited to a watch strap, a necklace clasp, and bracelet clasp;

A spring clip with conductors that close a circuit associated with wearable device 22 when wearable device 22 is unclipped, e.g., from clip-on earrings, or lapel clip.

Conductors on each end of a strap that make an electrical connection when the strap is closed, e.g., on a watch strap or bracelet strap;

A capacitive sensor on wearable device 22, where the capacity sensor measures proximity to a person. The capacity sensor may be included as part of a wearable device that is, for example, a watch, bracelet, or ring;

A heat/pulse sensor measuring proximity to a person. For example, the heat/pulse sensor may be included in a wearable device 22 that is, for example, a watch, a bracelet, or a ring; and Although other attachment mechanisms/devices may be used where the worn state of the wearable device is able to be determined based on, for example, a characteristic of the attachment mechanism/device and/or characteristic of the wearable device with respect to the user, etc.

Further, wearable device 22 may be configured to advertise its state (e.g., worn state) and/or establish and/or maintain wireless communication, e.g., secured wireless communication, to any other component/device of system 10, e.g., a software application 76 on authentication device 26 such as a mobile phone, a premises device 16 such as system receiver. In a non-limiting example, wearable device 22 may be configured to establish and/or maintain wireless communication by using BLUETOOTH (BLE), WiFi, or any other RF protocol.

In some embodiments, when BLE is used, the following steps may be performed. Wearable device 22 is powered on and begins transmitting periodic BLE advertising beacons, e.g., signals, indicating that it is "not paired." Using software application 76, e.g., a mobile application on a mobile phone, a user adds wearable device 22 to system 10, e.g., using a secure BLE connection. Software application 76, e.g., the mobile application on the mobile phone, securely stores a first security token on wearable device 22. The first security token may be later retrieved for validation, as described herein. Wearable device 22, e.g., after receiving the first security token, may alter its advertising data, e.g., by transmitting a signal, to indicate that wearable device 22 is paired and "not worn." Wearable device 22 may, e.g., at a later time, detect that the wearable device 22 has been put on, e.g., by using the detection methods described above, and communicate with software application 76, e.g., the mobile application on the mobile phone, to indicate a change in the worn status of the wearable device 22.

Software application 76 may securely connect to wearable device 22, retrieves the first security token used for validation, e.g., to confirm that wearable device 22 is a valid device, i.e., that wearable device 22 is the wireless device previously paired. Software application 76 may generate a notification, e.g., such as a pop-up notification on the display of the mobile phone, prompting the user to confirm that the user is in control of wearable device 22. In order to confirm, the user of the wearable device 22 may use multiple methods, including but not limited to unlocking, authentication device (e.g., the mobile phone) and/or press a button display by software application 76. After receiving confirmation, software application 76, e.g., the mobile application, authorizes wearable device 22 and/or stores a second security token, e.g., a new security token, on wearable device 22 for further validation. Then, wearable device 22 begins sending advertising beacons, e.g., transmitting at least a signal, indicating that wearable device 22 is in the "worn" state. It is noted that the steps performed by software application 76 may be performed by any other component/device of system 10 and/or authentication device 26 may be part of any other component/device of system 10, e.g., part of controller unit 14 and/or premises security system 12 and/or remote monitoring center 18.

In some other embodiments, a wearer/user of the wearable device 22 may activate wearable device 22, e.g., via a panic button. For example, the user may activate wearable device 22, thereby altering advertising packets transmitted by the wearable device 22, e.g., to indicate or trigger an action such as by pressing a panic button in order to cause premises security system 12 to perform one or more actions. Any other component/device of system 10, e.g., authentication device 26, may receive the advertising packets and/or verify that wearable device 22 is still in the "worn" state and/or connect to wearable device 22 to validate a security token, e.g., the second security token. If the security token is valid, any component/device of system 10, e.g., authentication device 26, software application 76, premises security system 12 performs the action, e.g., system panic.

Figure 8:
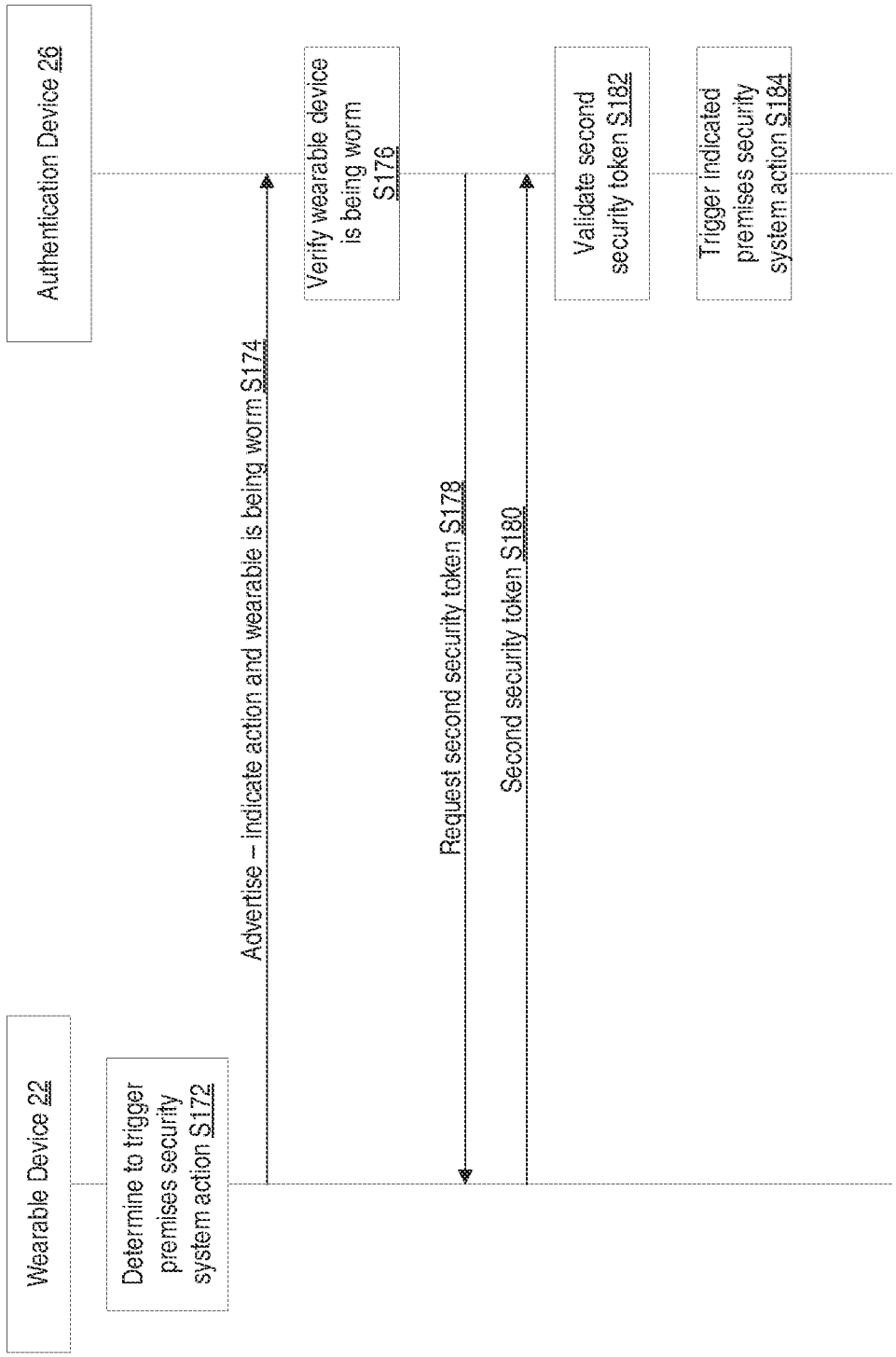
FIG. 8 is a signaling diagram of another example process according to some embodiments of the present disclosure.

FIG. 8 is a signaling diagram of an example process for triggering a premises security system according to the principles of the present invention. Wearable device 22 determines to trigger a premises security system action (Step S172). For example, a user may push/activate a panic button and/or provide a verbal and/or touch based input to wearable device 22 indicating the user wants to trigger a predefined premises security system action. Wearable device 22 advertises an indication of the premises security system action and an indication that wearable device 22 is being worn (Step S174). For example, the advertisements may be provided by advertising beacons transmitted by wearable device 22. Authentication device 26 verifies wearable device 22 is being worn (Step 176). For example, authentication device 26 may determine whether a predefined number of additional advertisement beacons have been received after receiving the first advertisement beacon.

Authentication device 26 transmits a request for the second security token (Step S178). For example, the request may be in response to the advertisement of Step S174 and verification in Step S176. The wearable device 22 receives the request and transmits the second security token to authentication device 26 such as via a secure connection (Step S180). Authentication device 26 validates the second security token (Step S182) and triggers the indicated premises security system action based on the validation (Step S184).

When a wearer removes device and/or causes the wearable device 22 to indicate that the wearable device 22 is not worn, or a 'worn' detection has failed, wearable device 22 may alter beacon data to indicate that wearable device 22 has been removed and/or is not worn.

Any other component/device of system 10, e.g., authentication device 26, may then receive beacon, connects to wearable device 22, validates the security token, perform an action, e.g., panic, in response to the change of worn state change, and/or note that wearable device 22 is no longer being worn by an authorized user.

Figure 9:
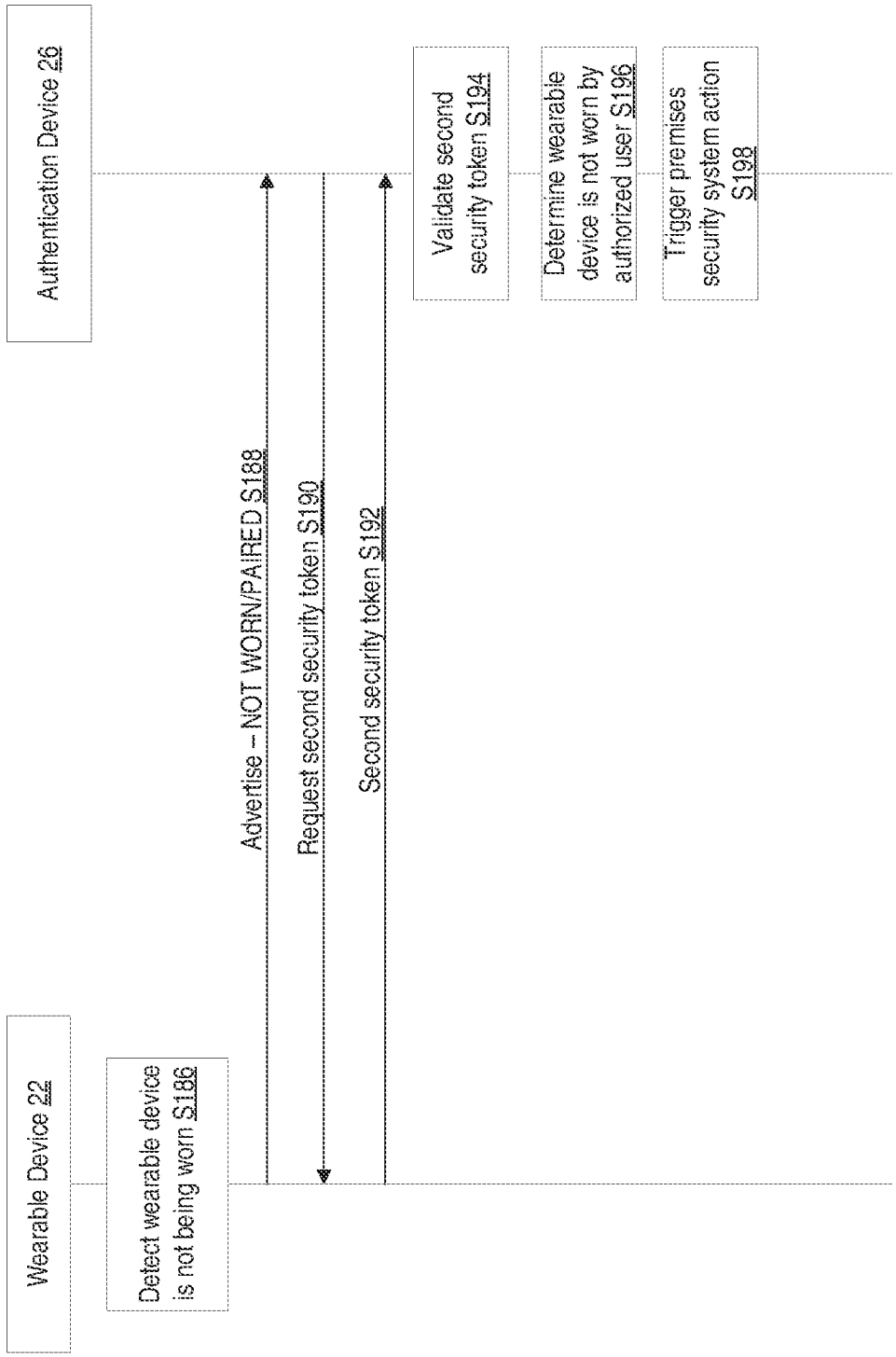
FIG. 9 is a signaling diagram of another example process according to some embodiments of the present disclosure.

FIG. 9 is signaling diagram of an example process performed when the wearable device 22 is removed, according to the principles of the present invention. Wearable device 22 detects wearable device 22 is not being worn (Step S186).

For example, hardware such as sensors and/or mechanisms may indicate that worn detection has failed (i.e., wearable device 22 is not being worn). Wearable device 22 advertises that wearable device 22 is NOT WORN/PAIRED (Step S188). For example, wearable device 22 indicates, via advertisement beacon(s), that wearable device 22 is paired with authentication device 26 and not being worn. Authentication device 26 requests a second security token from wearable device 22 in response to the advertisement of Step S188 (Step S190). The second security token is usable to validate that the wearable device 22 is an authorized device of the premises security system 12. Authentication device 26 receives the second security token and validates the second security token (Step S194). Authentication device 26 determines wearable device 22 is not worn by an authorized user such as based on the determination of Step S194 (Step S196). Authentication device 26 triggers a premises security action and/or updates the status of wearable device 22 stored in its memory to indicate wearable device 22 is no longer being worn by the authorized user (Step S198).

Worn state changes may happen either in range or out of range of any component/device of system 10. The component/device, e.g., authentication device, may re-validate wearable device 22 once the component/device begins receiving advertising packets again. For example, it may not make sense for a panic event that occurred out of range of the component/device to be reported after a certain amount of time has elapsed.

Broadcasting a worn state, such as a worn state change (e.g., going from worn to not worn when the wearable device 22 is removed or detached) allows at least one component/device of system 10, e.g., authentication device 26, to passively receive at least one advertising packet and discard it without taking further action. Otherwise, every time an advertising packet is received, additional steps may be required such as reaching out to wearable device 22 and requesting a stored security token to determine whether the wearable device 22 is still secured. Performing the additional steps may become a resource intensive operation, e.g., for a battery of wearable device 22.

Some Embodiments

Embodiment A1. A wearable device 22 configured to communicate at least with an authentication device 26 of associated with a premises security system 12, the wearable device 22 being configured to, and/or comprising a communication interface 30 and/or comprising processing circuitry 36 configured to:
receive a security token indicating that the wearable device 22 has been authorized to cause at least the authentication device 26 to trigger at least one premises security action; and
determine to cause a transmission of a signal indicating at least a worn state of the wearable device 22 based at least on the received security token, the transmitted signal being configured to cause at least the authentication device 26 to trigger the at least one premises security action.

Embodiment A2. The wearable device 22 of Embodiment A1, wherein the communication interface 30 is further configured to:
establish communication with the authentication device 26;
receive another security token from the authentication device 26 after the wearable device 22 has been added to the premises security system 12, the other security token being received for the authentication device to determine that a user of the wearable device 22 is in control of the wearable device 22; and
the processing circuitry 36 is further configured to:
determine to cause a transmission of another signal indicating any one of a communication state and the worn state.

Embodiment A3. The wearable device 22 of any one of Embodiments A1 and A2, wherein the processing circuitry 36 is further configured to:
determine the worn state, the worn state being one of worn and not worn.

Embodiment A4. The wearable device 22 of any one of Embodiments A2 and A3, wherein the communication interface 30 is further configured to transmit any one of the signal and the other signal at least to the authentication device 26.

Embodiment A5. The wearable device 22 of any one of Embodiments A1-A4, wherein the at least one premises security action includes one of arming the premises security system 12 and disarming the premises security system 12.

Embodiment B1. A method implemented by a wearable device 22 configured to communicate at least with an authentication device 26 of a premises security system 12, the method comprising:
receiving a security token indicating that the wearable device 22 has been authorized to cause at least the authentication device 26 to trigger at least one premises security action; and
determining to cause a transmission of a signal indicating at least a worn state of the wearable device 22 based at least on the received security token, the transmitted signal being configured to cause at least the authentication device 26 to trigger the at least one premises security action.

Embodiment B2. The method of Embodiment B1, wherein the method further includes:
establishing communication with the authentication device 26;
receiving another security token from the authentication device 26 after the wearable device 22 has been added to the premises security system 12, the other security token being received for the authentication device 26 to determine that a user of the wearable device 22 is in control of the wearable device 22; and
determining to cause a transmission of another signal indicating any one of a communication state and the worn state.

Embodiment B3. The method of any one of Embodiments B1 and B2, wherein the method further includes determining the worn state, the worn state being one of worn and not worn.

Embodiment B4. The method of any one of Embodiments B2 and B3, wherein the method further includes transmitting any one of the signal and the other signal at least to the authentication device 26.

Embodiment B5. The method of any one of Embodiments B1-B4, wherein the at least one premises security action includes one of arming the premises security system 12 and disarming the premises security system 12.

Embodiment C1. An authentication device 26 of a premises security system 12, the authentication device 26 being configured to communicate at least with a wearable device 22, the authentication device 26 being configured to, and/or comprising a communication interface 60 and/or processing circuitry 66 configured to:
receive a signal indicating at least a worn state of the wearable device 22; and trigger at least one premises security action based at least on the received signal and a security token associated with the wearable device 22.

Embodiment C2. The authentication device 26 of Embodiment C1, wherein the communication interface 60 is further configured to:
establish communication with the wearable device 22;
the processing circuitry 66 is further configured to:
add the wearable device 22 to the premises security system 12;
determine another security token after the wearable device 22 has been added to the premises security system 12, the other security token being determined to determine that a user of the wearable device 22 is in control of the wearable device 22; and
the communication interface 60 being further configured to:
transmit the other security token to the wearable device 22.

Embodiment C3. The authentication device 26 of Embodiment C2, wherein the processing circuitry 66 is further configured to:
determine that the user of the wearable device 22 is in control of the wearable device 22 based at least in part on the other security token at least by causing the communication interface 60 to retrieve the other security token from the wearable device 22.

Embodiment C4. The authentication device 26 of any one of Embodiments C1-C3, wherein the processing circuitry 66 is further configured to:
authorize the wearable device 22 to trigger at least one premises security action based at least in part on the security token at least by causing the communication interface 60 to retrieve the security token from the wearable device 22.

Embodiment C5. The authentication device 26 of any one of Embodiments C1-C4, wherein the at least one premises security action includes one of arming the premises security system 12 and disarming the premises security system 12.

Embodiment D1. A method implemented by an authentication device 26 of a premises security system 12, the authentication device 26 being configured to communicate at least with a wearable device 22, the method comprising:
receiving a signal indicating at least a worn state of the wearable device 22; and
triggering at least one premises security action based at least on the received signal and a security token associated with the wearable device 22.

Embodiment D2. The method of Embodiment D1, wherein the method further includes:
establishing communication with the wearable device 22; and
adding the wearable device 22 to the premises security system 12;
determining another security token after the wearable device 22 has been added to the premises security system 12, the other security token being determined to determine that a user of the wearable device 22 is in control of the wearable device 22; and
transmitting the other security token to the wearable device 22.

Embodiment D3. The method of Embodiment D2, wherein the method further includes determining that the user of the wearable device 22 is in control of the wearable device 22 based at least in part on the other security token at least by retrieving the other security token from the wearable device 22.

Embodiment D4. The method of any one of Embodiments D1-D3, wherein the method further includes authorizing the wearable device 22 to trigger at least one premises security action based at least in part on the security token at least by retrieving the security token from the wearable device 22.

Embodiment D5. The method of any one of Embodiments D1-D4, wherein the at least one premises security action includes one of arming the premises security system 12 and disarming the premises security system 12.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed:

1. An authentication device associated with a premises security system and configured to communicate with a wearable device, the authentication device comprising:
   processing circuitry configured to:
   receive an advertisement indicating the wearable device is powered on;
   determine that the wearable device is authorized to participate in the premises security system;
   cause transmission of a first security token based at least in part on determining that the wearable device is authorized to participate in the premises security system, the first security token being usable to validate that the wearable device is authorized to participate in the premises security system;
   receive a status update indicating that the wearable device is being worn;
   in response to the status update, request the first security token from the wearable device;
   receive the first security token from the wearable device;
   validate that the wearable device is authorized to participate in the premises security system based at least in part on the first security token received from the wearable device;
   in response to validating that the wearable device is authorized to participate in the premises security system based at least in part on the first security token received from the wearable device, cause transmission of a second security token to the wearable device, the second security token being usable to trigger a premises security system action; and
   receive, from the wearable device, a user request to trigger the premises security system action, the user request further indicating that the wearable device is being worn;
   in response to the user request, cause transmission of a second security token request;
   receive, in response to the second security token request, the second security token;
   validate that the wearable device is authorized to participate in the premises security system based at least in part on the second security token received from the wearable device; and
   trigger the premises security system action based at least in part on validating that the wearable device is authorized to participate in the premises security system.

2. The authentication device of claim 1, wherein the processing circuitry is further configured to:
   receive an additional advertisement from the wearable device, the additional advertisement indicating that the wearable device is being worn;
   in response to the additional advertisement, request the second security token from the wearable device;
   receive the second security token from the wearable device;
   validate that the wearable device is authorized to participate in the premises security system based at least in part on the second security token received from the wearable device;
   after validating that the wearable device is authorized to participate in the premises security system, determine that the wearable device has left a communication range of the authentication device; and
   trigger the premises security system action in response to at least determining that the wearable device has left the communication range of the authentication device.

3. The authentication device of claim 2, wherein the premises security system action comprises arming the premises security system.

4. The authentication device of claim 1, wherein, after transmitting the second security token to the wearable device, the first security token is no longer usable to validate that the wearable device is authorized to participate in the premises security system.

5. The authentication device of claim 1, wherein the processing circuitry is further configured to:
   prompt a user of the authentication device to confirm the user is wearing the wearable device;
   receive an indication that the user is wearing the wearable device; and
   cause transmission of the second security token to the wearable device in response to the indication that the user is wearing the wearable device.

6. The authentication device of claim 1, wherein the authentication device is a mobile wireless device, a control panel of the premises security system, or a control device of the premises security system.

7. A wearable device configured to communicate with an authentication device associated with a premises security system, the wearable device comprising:
   processing circuitry configured to:

receive a first security token that is usable to validate that the wearable device is authorized to participate in the premises security system;
store the first security token;
determine that the wearable device is being worn;
cause transmission of a status update indicating that the wearable device is being worn;
receive a request for the first security token, the request being associated with the status update;
cause transmission of the first security token in response to the request for the first security token, the first security token being usable to validate that the wearable device is authorized to participate in the premises security system;
receive a second security token in response to transmitting the first security token;
discard the first security token based at least in part on receiving the second security token;
store the second security token, the second security token being usable to validate that the wearable device is authorized to participate in the premises security system and to trigger a premises security system action;
determine to trigger the premises security system action based at least in part on a user input;
cause transmission of a user request indicating that the wearable device is being worn and that the user requests that the premises security system action be triggered;
receive a request for the second security token subsequent to transmitting the user request; and
cause transmission of the second security token in response to the request for the second security token, the second security token being configured to trigger the premises security system action based at least in part on a validation of the second security token.

8. The wearable device of claim 7, wherein the processing circuitry is further configured to:
determine that the wearable device is no longer being worn;
in response to determining that the wearable device is no longer being worn, cause transmission of an advertisement indicating the wearable device is not being worn;
receive a request for the second security token, the request for the second security token being associated with the advertisement indicating the wearable device is not being worn; and
cause transmission of the second security token in response to the request for the second security token to trigger the premises security system action.

9. The wearable device of claim 7, wherein the premises security system action comprises triggering a panic alarm.

10. The wearable device of claim 7, further comprising a sensor configured to determine that the wearable device is being worn.

11. The wearable device of claim 7, wherein the first security token is no longer usable to validate that the wearable device is authorized to participate in the premises security system after the second security token is received.

12. A method, comprising:
receiving, by an authentication device for a premises security system, an advertisement from a wearable device, the advertisement indicating that the wearable device is powered on; determining, by the authentication device, that the wearable device is authorized to participate in the premises security system;
transmitting, by the authentication device, a first security token to the wearable device in response to determining that the wearable device is authorized to participate in the premises security system;
receiving, by the authentication device, a status update from the wearable device indicating that the wearable device is being worn by a user;
transmitting, by the authentication device, a request to the authentication device for the first security token in response to receiving the status update;
receiving, by the authentication device, the first security token from the wearable device;
determining, by the authentication device, that the wearable device is authorized to participate in the premises security system based at least in part on the first security token received from the wearable device;
in response to determining that the wearable device is authorized to participate in the premises security system based at least in part on the first security token received from the wearable device, transmitting a second security token to the wearable device, the second security token being usable to facilitate initiating a premises security system action;
receiving, by the authentication device and from the wearable device, a user request to trigger the premises security system action, the user request further indicating that the wearable device is being worn;
in response to the user request, transmitting, by the authentication device, of a second security token request;
receiving, by the authentication device and in response to the second security token request, the second security token;
validating, by the authentication device, that the wearable device is authorized to participate in the premises security system based at least in part on the second security token received from the wearable device; and
triggering, by the authentication device, the premises security system action based at least in part on validating that the wearable device is authorized to participate in the premises security system.

13. The method of claim 12, further comprising:
receiving, by the authentication device, an additional status update from the wearable device indicating that the device is being worn by the user;
in response to receiving the additional status update, obtaining the second security token from the wearable device;
determining, by the authentication device that the wearable device is authorized to participate in the premises security system based at least in part on the second security token received from the wearable device;
determining, by the authentication device, that the wearable device is not in communication range of the authentication device; and
in response to determining that the wearable device is not in communication range of the authentication device, triggering, by the authentication device, the premises security system action.

14. The method of claim 13, wherein triggering the premises security system action comprises arming the premises security system.

15. The method of claim 12, further comprising:
determining, by the authentication device, that the wearable device is not in communication range of the authentication device; and in response to determining that the wearable device is not in communication range of the authentication device, triggering, by the authentication device, the premises security system action.

16. The method of claim 12, further comprising:
transmitting, by the authentication device, a command to prompt a user of the authentication device to confirm that the user is wearing the wearable device;
receive, by the authentication device, a confirmation that the user is wearing the wearable device; and
in response to the confirmation, transmitting, by the authentication device, the second security token to the wearable device.

17. The method of claim 12, wherein the authentication device comprises a control panel for the security premises system.

18. The method of claim 12, wherein the premises security system action comprises disarming the premises security system.

* * * * *